United States Patent
Lo

(10) Patent No.: US 8,196,626 B2
(45) Date of Patent: Jun. 12, 2012

(54) TIRE WITH ASYMMETRIC TREAD PROFILE

(76) Inventor: Tsai Jen Lo, Chang-Hwa (TW)

(*) Notice: Subject to any disclaimer, the term of this patent is extended or adjusted under 35 U.S.C. 154(b) by 632 days.

(21) Appl. No.: 12/318,776

(22) Filed: Jan. 8, 2009

(65) Prior Publication Data

US 2010/0170600 A1 Jul. 8, 2010

(51) Int. Cl.
*B60C 11/113* (2006.01)
(52) U.S. Cl. .......... 152/209.8; 152/209.12; 152/455
(58) Field of Classification Search ............ 152/209.8, 152/209.9, 209.12, 455, 456
See application file for complete search history.

(56) References Cited

U.S. PATENT DOCUMENTS

| | | | | |
|---|---|---|---|---|
| 3,844,226 A | * | 10/1974 | Brodeur et al. | 105/222 |
| 4,830,077 A | * | 5/1989 | Goto et al. | 152/209.8 |
| 6,298,890 B1 | * | 10/2001 | Binsfeld | 152/209.16 |
| 6,415,837 B1 | * | 7/2002 | Mackle et al. | 152/209.5 |
| 2006/0266455 A1 | * | 11/2006 | Nagai | 152/209.8 |

FOREIGN PATENT DOCUMENTS

| | | | |
|---|---|---|---|
| JP | 02-128905 | * | 5/1990 |
| JP | 05-139109 | * | 6/1993 |
| JP | 2004-359077 | * | 12/2004 |

OTHER PUBLICATIONS

ATV Paddles. Product Catalog [online]. Skat-Trak, Dec. 5, 2002 [retrieved Jul. 18, 2011] Retrieved from the Internet: <URL: http://web.archive.org/web/20021205081001/http://www.skat-trak.com/atvsand_main.html>.*

* cited by examiner

*Primary Examiner* — Steven D Maki
*Assistant Examiner* — Robert Dye
(74) *Attorney, Agent, or Firm* — Rosenberg, Klein & Lee

(57) ABSTRACT

A tire includes a tread profile and a plurality of ribs extending across the tread profile. Each rib includes a first portion and a second portion on two sides of the center axis of the tread profile. The first portion includes a first section which has a constant height. The length of the first section is "L1". A first shoulder is connected between the first section and the outer side of the tire by a first radius. "R1". The second portion includes a second section which has the same constant height as the first section. The length of the second section is "L2". A second shoulder is connected between the second section and the inner side of the tire by a second radius "R1". A ratio of the "L1" to the "L2" is 1.1 to 1.4, and a ratio of the "R1" to "R2" is 0.5 to 0.9.

4 Claims, 4 Drawing Sheets

TIRE WITH ASYMMETRIC TREAD PROFILE

FIELD OF THE INVENTION

The present invention relates to a tire, and more particularly, to a tire with asymmetric tread profile which allows the tire to perform well in sandy and muddy situation.

BACKGROUND OF THE INVENTION

For vehicles that are to be used on bad conditions such as beaches, river beds, streams, muddy roads and deserts, the tires of the vehicles are required to have specific designed tread profile so as to have better traction.

Those tread profiles generally have offset design, namely, asymmetric tread profiles with higher traction while turning at high speed.

Two conventional tires with asymmetric tread profile known to applicant are disclosed in U.S. Pat. Nos. 4,840,210 and 5,971,048, the former patent discloses a tire whose maximum outer diameter is located at a distance "L" from the center line of the tire section and the value of "L" is 0.05 to 0.30 of the width of the tire section, the ratio of the diameter "d1" of the outer shoulder and the diameter "d2" of the inner shoulder are 0.98 to 1.00.

The latter patent discloses a tire with an inner shoulder profile and an outer shoulder profile, each shoulder profile has a shoulder drop which is the distance from the point of maximum tire diameter to the point of the shoulder at the edge of the shoulder profile. The shoulder profile is asymmetric and has its point of maximum tire diameter offset in the axial direction of the tire from the center line of the tire section in the direction f the inner shoulder. The shoulder drop of the outer shoulder is greater than the shoulder drop of the inner shoulder. Both of them do not disclose specific size relationship of the tread.

SUMMARY OF THE INVENTION

The present invention intends to provide a tire with asymmetric tread profile, wherein the detailed specification of the ribs on the tread profile is defined so as to obtain satisfied performance.

The primary object of the present invention is to provide a tire with an asymmetric tread profile which allows the tire to be operated on sandy and muddy roads with better traction and non-slide features.

The present invention relates to a tire used on rear wheels of vehicle, the tire includes a tread profile and a plurality of main and sub ribs extending on the tread profile. Main rib includes first portion and second portion extending across the tread profile. The first portion includes first section which has a constant height. The length of the first section is "L1". A first shoulder is connected between the first section and the sidewall of the tire by a first radius "R1". The first portion is near to the vehicle. The second portion includes second section which has the same constant height as the first section. The length of the second section is "L2". A second shoulder is connected between the second section and sidewall of the tire by a second radius "R2". The second portion is far away from the vehicle. The ratio of "L1" to "L2" is 1.1 to 1.4, and the ratio of "R1" to "R2" is 0.5 to 0.9.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
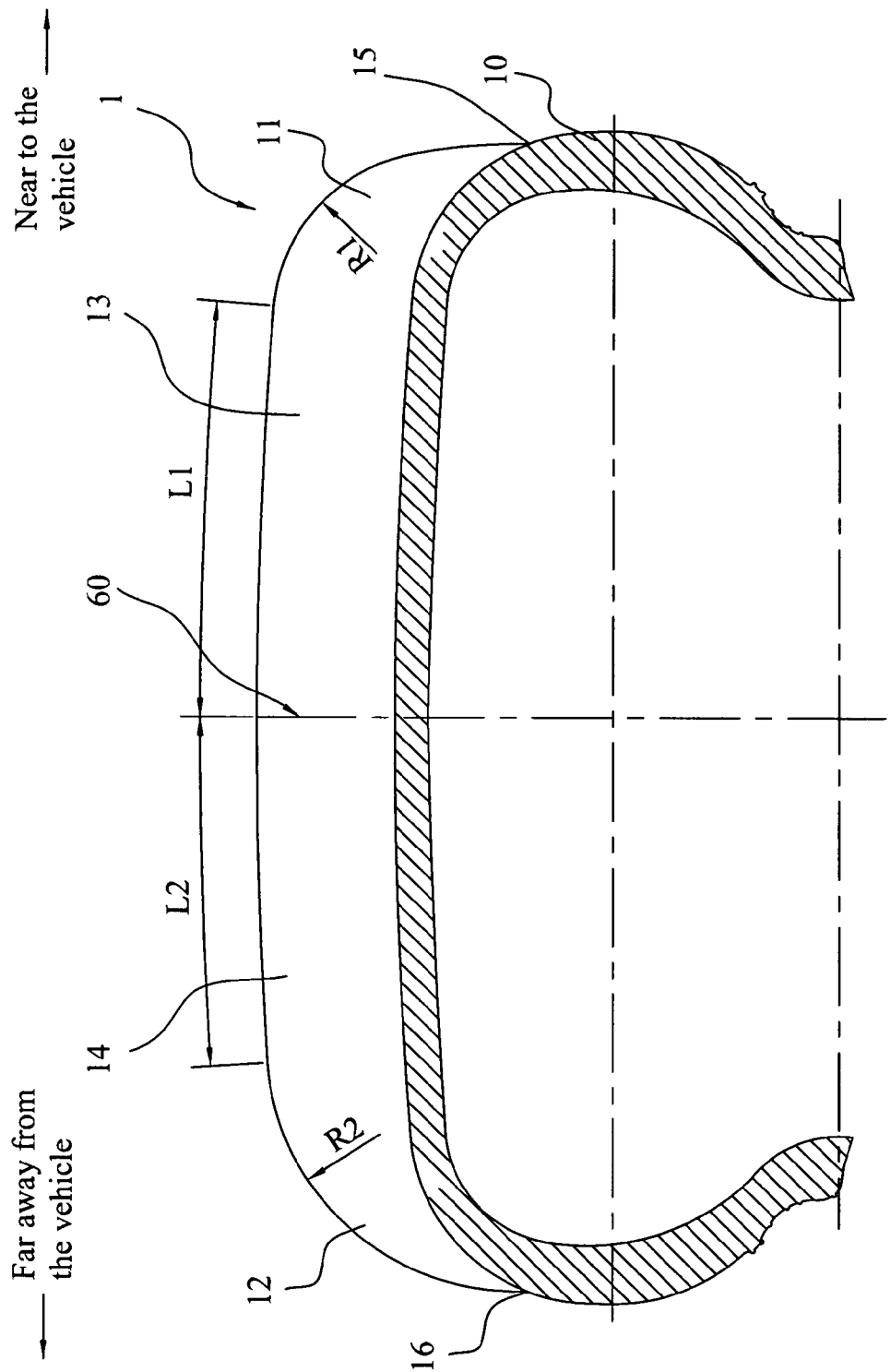
FIG. 1 is a cross sectional view to show the tire of the present invention.

Referring to FIG. 1, the tire 1 of the present invention comprises a tread profile 10 with sidewalls extending therefrom and a plurality of main and sub ribs extending on the tread profile 10. Each main rib is an elongated rib and includes a first portion 13, a second portion 14, a first shoulder 11 connected to the first portion 13 and a second shoulder 12 connected to the second portion 14. The first portion 13 extending across the tread profile 10 is near to the vehicle. The first portion 13 includes a first section with a constant height. The length of the first section from the centerline 60 in the axial direction toward the first shoulder of the tire 1 is "L1". The first shoulder 11 is connected between the first section of the first portion 13 and the sidewall 15 of the tire 1 by a first radius "R1".

The second portion 14 extending across the tread profile 10 is far away the vehicle. The second portion 14 includes a second section with a constant height. The length of the second section from the centerline 60 in the axial direction toward the second shoulder of the tire 1 is "L2". The second shoulder 12 is connected between the second section of the second portion 14 and the sidewall 16 of the tire 1 by a second radius "R2". The first and second sections have the same height.

The ratio of the "L1" to the "L2" is 1.1 to 1.4, and the ratio of the "R1" to "R2" is 0.5 to 0.9.

Figure 2:
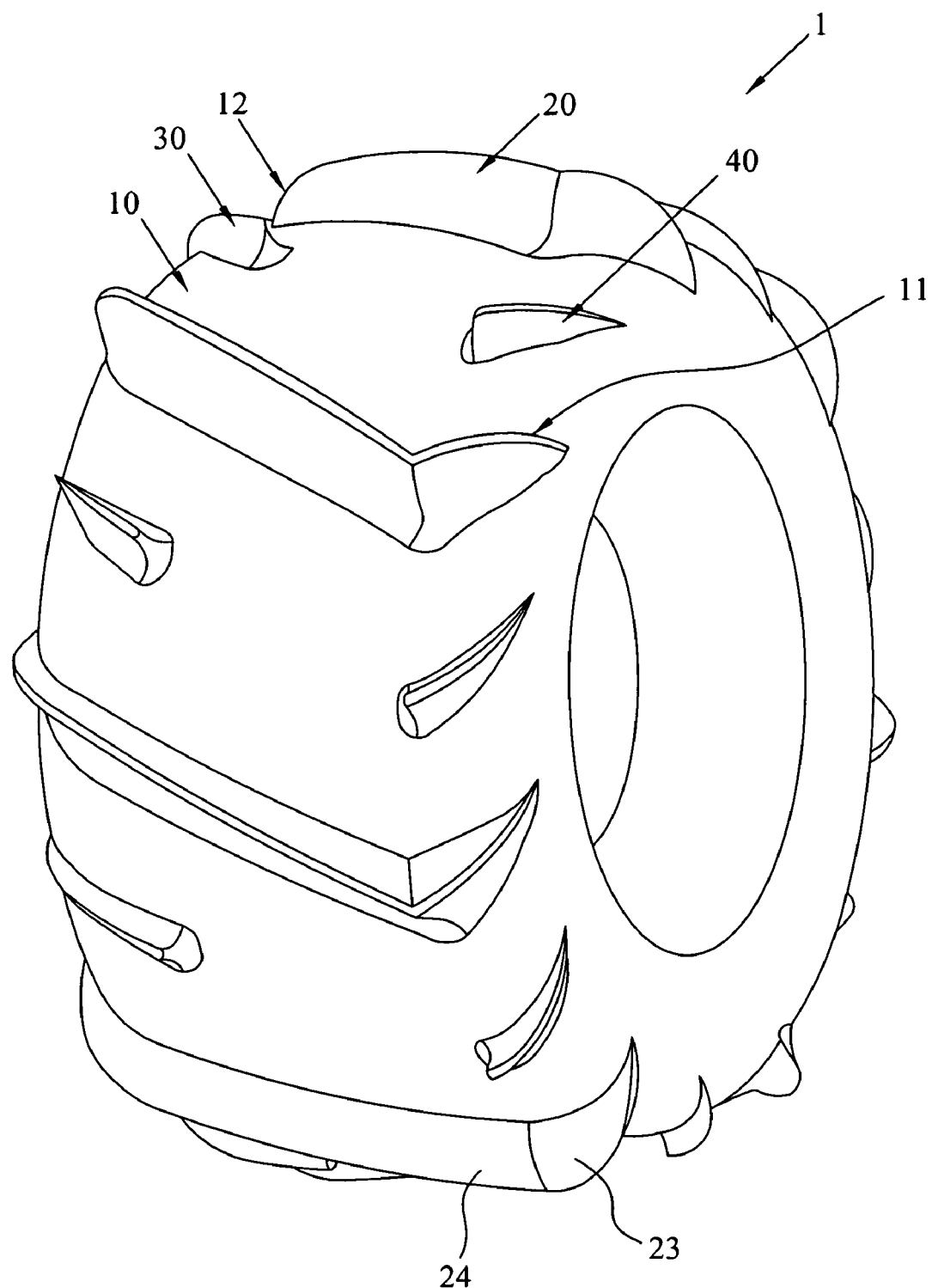
FIG. 2 is a perspective view to show the tire of the present invention.

The tire 1 of the present invention can be used as paddle tire in sandy roads and is disclosed in FIG. 2, wherein the tread profile 10 includes main ribs 20 which are located transversely on the tread profile 10. The main ribs 20 each includes a short section 23 and a long section 24. The short section 23 is connected to the first shoulder 11 which gradually reduces its height by a curved surface with radius "R1". The long section 24 is connected to the second shoulder 12 which gradually reduces its height by another curved surface with radius "R2". The tire 1 with the asymmetric tread profile can meet the requirements such as more traction better operation while riding on sandy or muddy roads or the like.

In addition, sub ribs, namely, second and third ribs 30, 40, both of them are located on the tread profile 10 of the tire 1 and orientated in axial direction between main ribs 20 which are in shape of a "check mark". Such novel design is able to not only dig into the sands but also easily and quickly expel sands via the grooves between the ribs 20, 30, 40, as a result, the tires can throw away more sands and get higher traction without any slide and slip.

Figure 3:
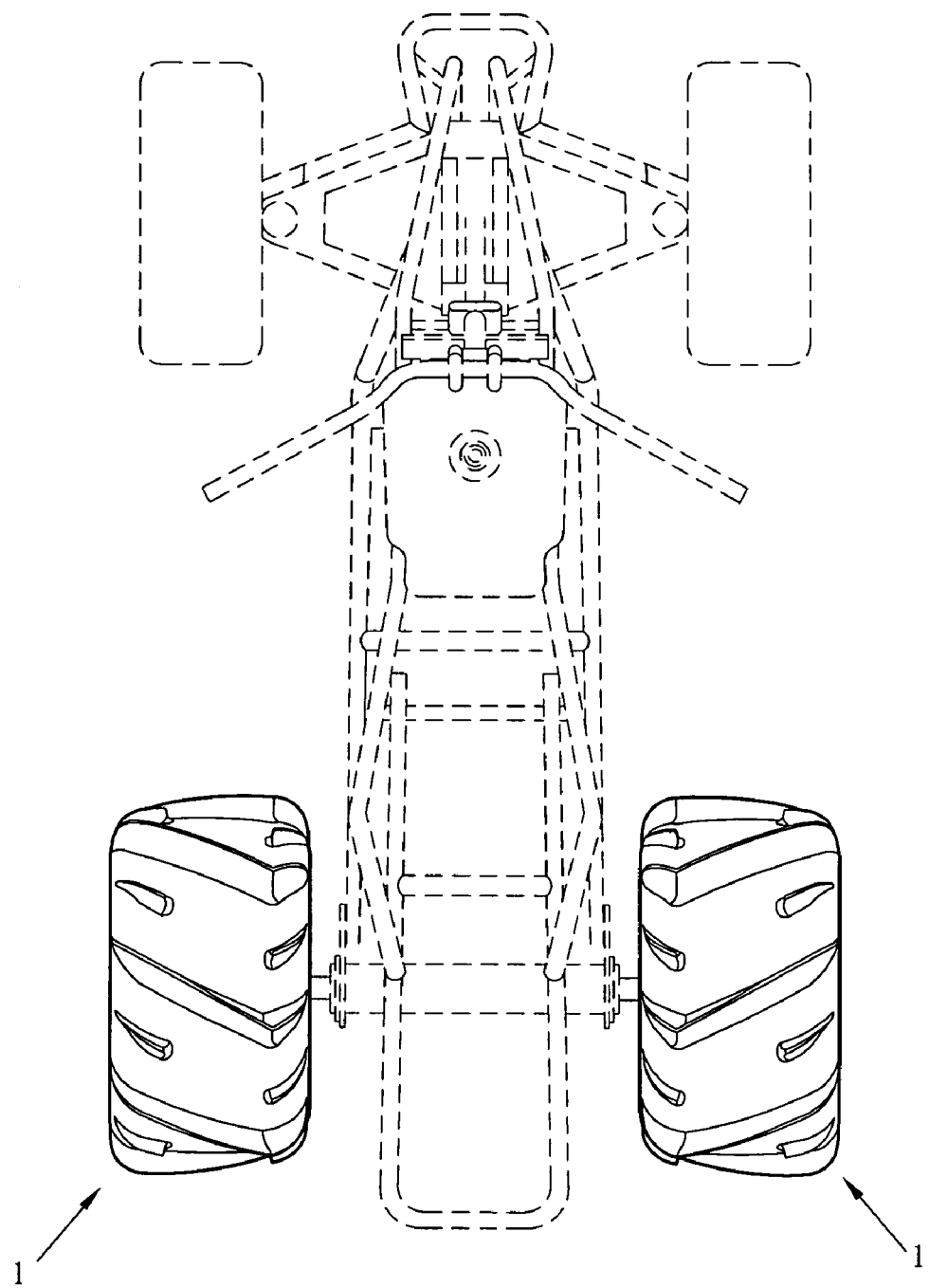
FIG. 3 shows the rear wheels of an All Terrain Vehicle.

As shown in FIG. 3, the tires 1 are connected to rear wheels of an All Terrain Vehicle and the second shoulders 12 are far away from the vehicle.

Figure 4:
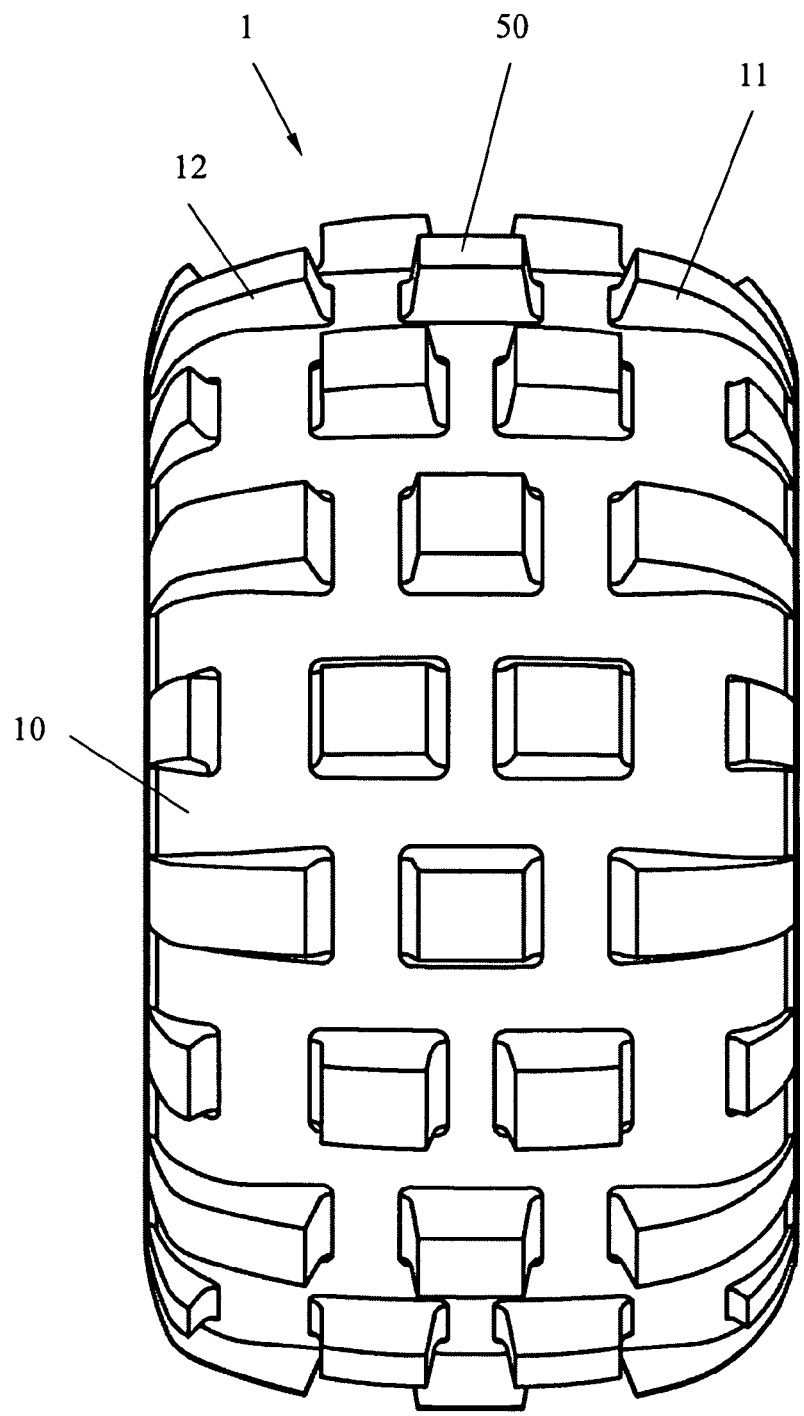
FIG. 4 is a perspective view to show another embodiment of the tire of the present invention.

As shown in FIG. 4, the ribs can be substantially trapezoid ribs 50 and grooves are defined between the ribs in axial and circumferential directions. The tires 1 with the substantially trapezoid ribs 50 and separated first and second shoulders 11, 12 can also have better performance.

While we have shown and described the embodiment in accordance with the present invention, it should be clear to those skilled in the art that further embodiments may be made without departing from the scope of the present invention.

The present invention relates to a tire, and more particularly, to a tire with asymmetric tread profile which allows the tire to perform well in sandy and muddy situation.

What is claimed is:

1. A tire comprising:

a tread profile with sidewalls extending therefrom;

a plurality of ribs extending on the tread profile and each rib including a first portion, a second portion, a first shoulder connected to the first portion and a second shoulder connected to the second portion, the first portion extending across the tread profile being next to a vehicle when the tire is mounted thereon, the first portion including a first section with a constant height, the first section having a length "L1" extending from a centerline of the tire in an axial direction toward the first shoulder, the first shoulder being curved from the constant height first section toward the sidewall and the first shoulder being connected between the first section of the first portion and the sidewall of the tire by a first radius "R1";

the second portion extending across the tread profile being further away from the vehicle when the tire is mounted thereon than the first portion, the second portion including a second section with a constant height, the second section having a length "L2" extending from a centerline of the tire in an axial direction toward the second shoulder, the second shoulder being curved from the constant height second section toward the sidewall and the second shoulder being connected between the second section of the second portion and the sidewall of the tire by a second radius "R2", the first and second sections having the same height, and the ratio of the "L1" to the "L2" being 1.1 to 1.4, and the ratio of the "R1" to "R2" being 0.5 to 0.9.

2. The tire as claimed in claim 1, wherein each of the ribs is an elongated rib.

3. The tire as claimed in claim 1, wherein the ribs are substantially trapezoid ribs.

4. The tire as claimed in claim 1, the tire is connected to a rear wheel of an All Terrain Vehicle.

* * * * *